LINE FINDER ALLOTTING SYSTEMS

Filed Dec. 22, 1954 3 Sheets-Sheet 1

INVENTOR.
H. L. HORWITZ
M. E. HOMAN
G. L. HASSER
BY
R. J. Perry
AGENT

LINE FINDER ALLOTTING SYSTEMS

Filed Dec. 22, 1954 3 Sheets-Sheet 2

INVENTOR.
H. L. HORWITZ
M. E. HOMAN
BY G. L. HASSER
R. J. Perry
AGENT

March 3, 1959 H. L. HORWITZ ET AL 2,876,287

LINE FINDER ALLOTTING SYSTEMS

Filed Dec. 22, 1954 3 Sheets-Sheet 3

INVENTOR.
H. L. HORWITZ
M. E. HOMAN
BY G. L. HASSER
R. J. Perry
AGENT 2,876,287

LINE FINDER ALLOTTING SYSTEMS

Henry Leopold Horwitz, Nutley, and Merle Edward Homan and George Louis Hasser, Packanack Lake, N. J., assignors to International Telephone and Telegraph Corporation, New York, N. Y., a corporation of Maryland Application December 22, 1954, Serial No. 477,038

13 Claims. (Cl. 179—18)

This invention relates to line finder start circuits and to supervisory arrangements associated therewith.

Line finder start and distributor circuits are generally of two kinds and each is subject to disadvantages.

One type in which an idle finder is selected over a series chain circuit, has the objection that in a small office, during slack periods, such as during the night hours, a subscriber who makes a number of consecutive calls within a short period, is apt to seize the same line finder for every such call. If this line finder is faulty the subscriber is unable to complete a call for he cannot seize another until some other subscriber engaged in making a call takes into use the faulty finder.

In the second type of arrangement an idler finder is selected by an allotter switch. This switch can only deal with one call at a time and is subject to great contact wear since after each call it is required to advance very rapidly to the contacts of the next idle finder. It has been proposed to split the line finders into two groups each of which is served by an allotter switch but in such case each switch still gets considerable contact wear and if one breaks down all the traffic must be handled by the other.

An object of our invention is the provision of a start circuit arrangement in which the disadvantages of both the aforementioned systems are avoided.

According to one feature of our invention a free finder is taken into use over a chain circuit but a distributor switch is provided for extending the start conductors to different points of entry into the chain circuit. The distributor switch, after a seized finder has found a calling line, steps to a different point of entry into the chain, and an automatic check is made to establish that the switch has properly stepped to its next position.

Figure 1:
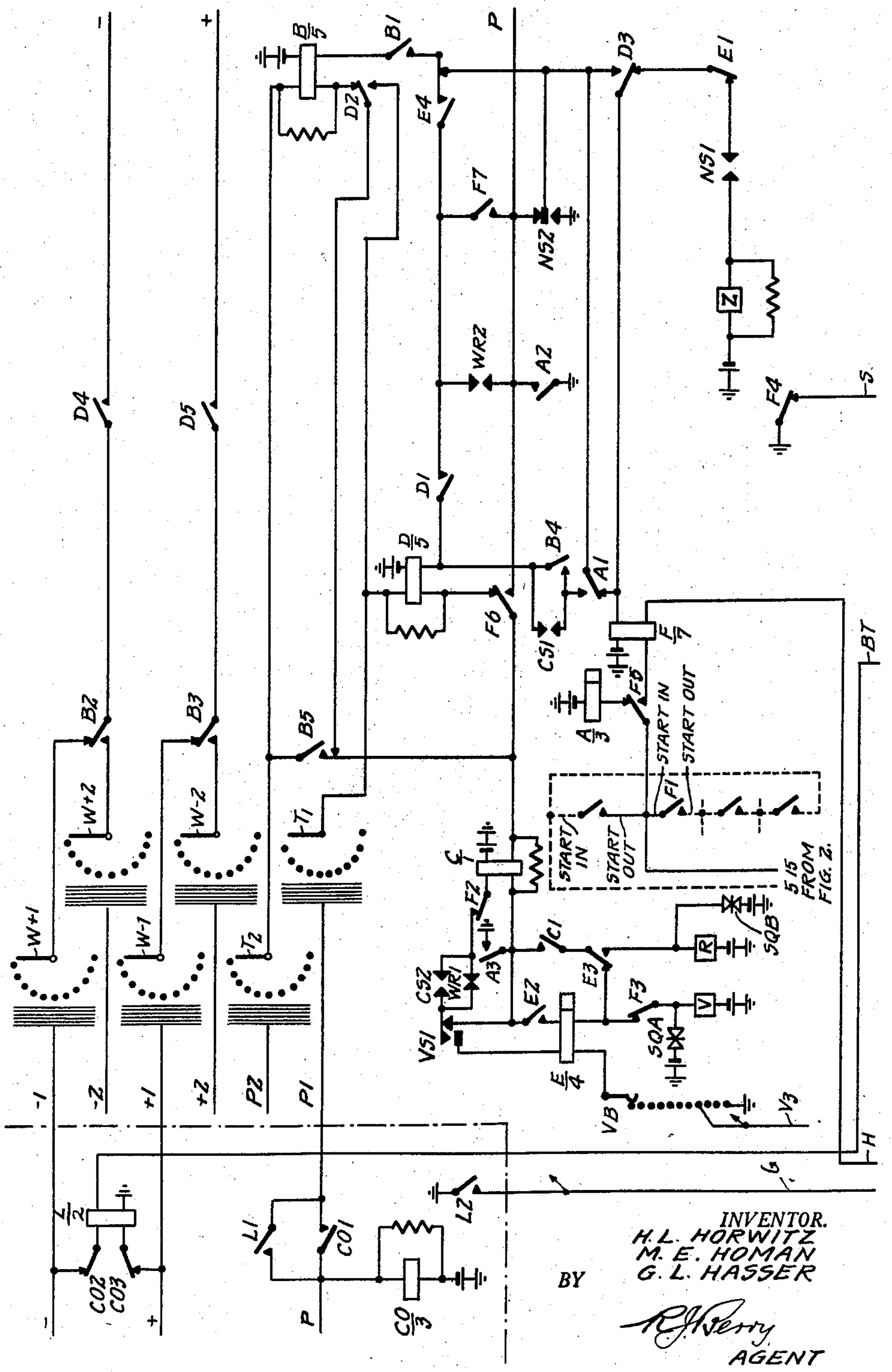
Figure 2:
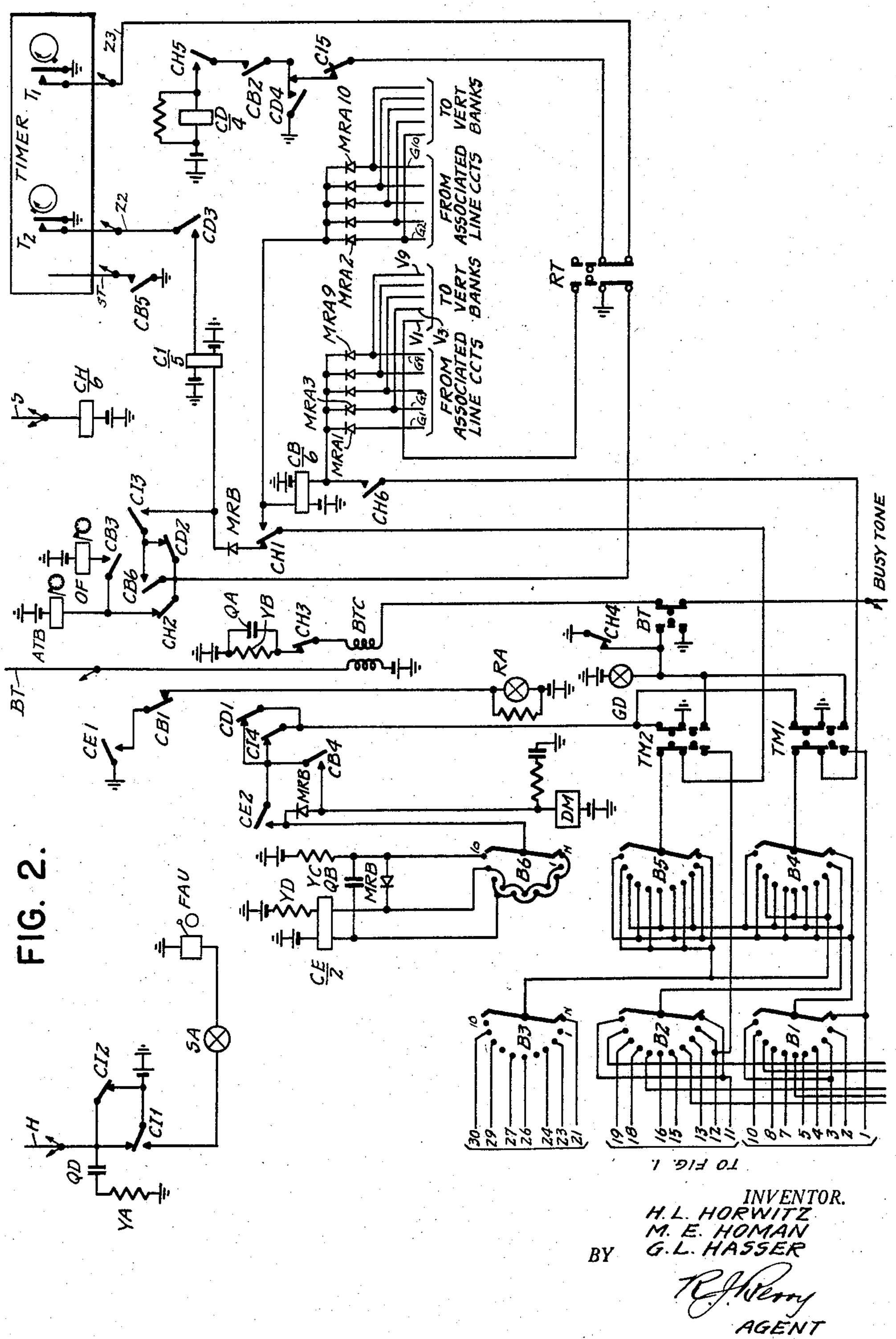
Figure 3:
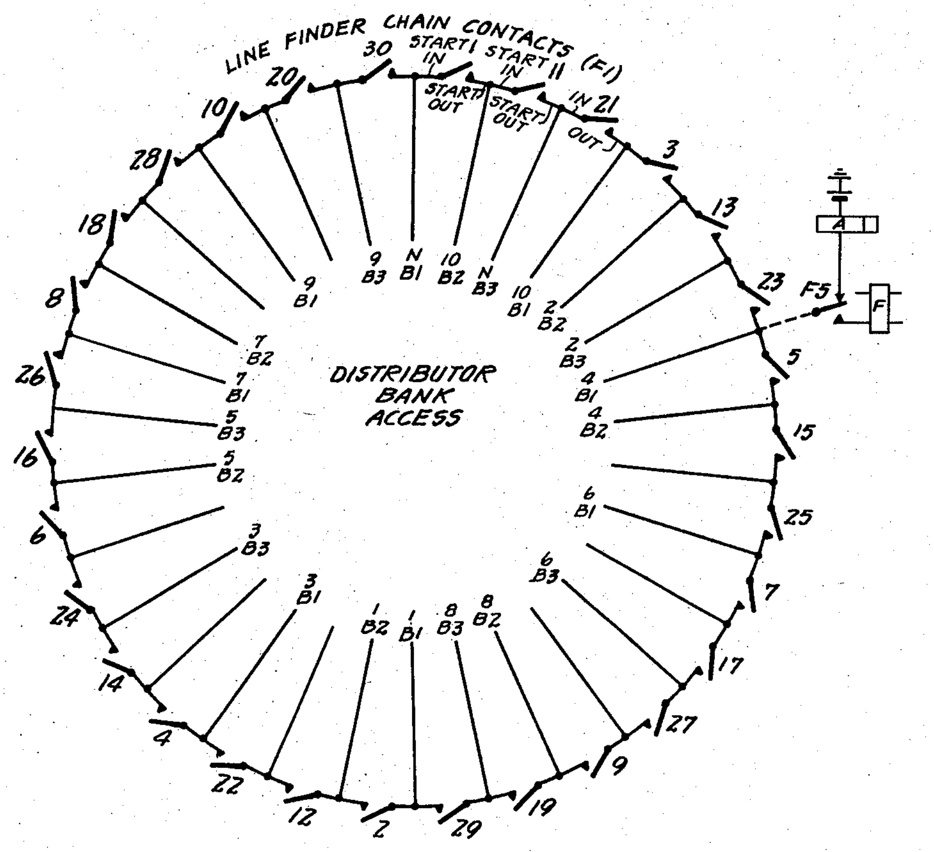

The above-mentioned and other objects and features of our invention will be clearly understood from a consideration of the following description of a preferred embodiment thereof, taken in conjunction with the accompanying drawings, in which Fig. 1 is a circuit diagram of a subscriber's line circuit and a line finder, Fig. 2 is a circuit diagram of a distributor switch and supervisory circuit, and Fig. 3 is a chart used in explaining the arrangement of the distributor switch.

The line finders consist of a two-coordinate selector mechanism having two sets of wipers and ten levels of twenty lines per level.

Thirty finders numbered 1 to 30 are associated with 200 substation lines and each terminates in the usual manner in a first group selector (not shown).

The line relay L, Figure 1, in each substation line circuit is arranged, when energized, via contact L2 to ground a sub-group start lead G which extends to the distributor switch circuit, Figure 2, and which also marks the vertical bank contacts of the levels of the line finders in which the line appears. The sub-group start leads G are divided into odd and even groups G1, G3, etc., and G2, G4, etc.

The distributor switch DS, Fig. 2, comprises five wipers B1 to B5 and corresponding contact banks, plus an additional wiper B6 and bank which is used for checking purposes. This switch may be a single-motion stepping switch of any suitable kind, but in the drawing it is shown as an eleven point switch, the first position being indicated N and the ten other positions 1 to 10, although in operation the switch is not homed.

The line finders are taken into use over a closed series chain circuit including make contacts F1 of a relay F of each finder which is energized in the busy condition of the respective finder. The "start-in" and "start-out" leads of the finders are connected in the following order, the numbers representing the numerical designation of the finders: 1-11-21, 3-13-23, 5-15-25, 7-17-27, 9-19-29, 2-12-22, 4-14-24, 6-16-26, 8-18-28, 10-20-30. The chain can be entered at any desired point over conductors extending from the contacts of the banks associated with wipers B1 to B3 of the distributor switch DS. The odd sub-group start leads G1, G3, etc., are connectable to the wiper B4 of the switch DS, via contacts TM1 and CH6 whilst the even sub-group leads G2, G4, etc., are connectible to the wiper B5 via contacts TM2 and CH1 front. The successive bank contacts engaged by the wiper B4 are connected to the wipers B1, B2, B3 in the order B1, B2, B3, whilst the successive bank contacts engaged by the wiper B5 are connected to these wipers in the order B3, B1, B2. It will thus be seen that in every position of the distributor switch the wipers B4 and B5 are extended to different ones of the wipers B1, B2, B3 and to different "start-in" leads to the chain circuit. Two line finders, one in each group (odd and even) may therefore hunt simultaneously. This will be apparent from a consideration of the chart of Fig. 3 in which the periphery of the circle represents the chain circuit, the contacts F1 in the respective finders being indicated by the number of the finder. The radial lines indicate the points of entry into the chain over the wipers B1, B2 and B3 in the various positions of the distributor switch. For example, in position 7, a line in the odd group has access over the wiper B2 at line finder #18, whilst a line in the even group has access over the wiper B1 at line finder #18.

It will also be seen that since the distributor switch steps to the next position on successive calls, entry is then made to the closed chain circuit at a different and widely-spaced "start-in" point, whereby different line finders are taken into use on successive calls even though such calls are originated by the same subscriber or by different subscribers in the same sub-group. Thus in position 8 of the distributor switch, a line in the odd group has access at finder #29 and a line in the even group has access at finder #19, and in position 9, a line in the odd group has access at finder #10 and a line in the even group has access at finder #30.

When a subscriber originates a call, the line relay L, Fig. 1, of his line circuit is energized over the + and — leads and the subscriber's line loop. Relay L operates and at contacts L1 connects the cut-off relay CO to the appropriate test lead P1 or P2 to mark the line finder bank contacts associated with the calling line. At contacts L2 the sub-group start lead G is grounded to mark the vertical position of the line and to start a line finder.

Provided that one or more line finders of the group are available, relay CH in the distributor switch and supervisory circuit of Fig. 2, is normally operated over parallel break contacts F4 of relays such as F, Fig. 1 of free line finders. Assuming that the calling line is in sub-group 3 and that the distributor switch DS is in position #4, ground on the lead G3 energizes relay CB, Fig. 2, via rectifier MRA3, grounds via conductor V3 the vertical bank contacts VB, Fig. 1 of the line finders to mark the level on which the calling line appears, and also connects ground to the "start-in" lead of the line finder #15 via make contacts CH6, contacts of a toggle switch TM1, wipers B4 and B2 of distributor switch DS in its fourth position. The ground on the "start-in" lead 15 operates relay A, Fig. 1, in the circuit of line finder #15 which causes the latter to hunt for the calling line. It will be noted that if the call had originated with a line in an even group, ground on one of the start leads G2 . . . G10 energizes relay CB, Fig. 2, over its left-hand winding and "start-in" lead 5 will be grounded via contacts CH1, and banks B5, B1.

Relay CB, upon operating, energizes the stepping magnet DM of the distributor switch DS over contacts CB4, C16, CD1 in parallel and right-hand contacts of a toggle switch TM2, at contacts CB3 prepares a circuit for an overflow meter OF, at contacts CB2 closes a circuit for relay CD over CH5, C17, right-hand contacts of RT and lead Z3, and at contacts CB5 grounds the lead ST to start or cause the continued operation of a timer. Relay CD locks up over contacts CD4.

The timer may be of any suitable construction and is shown in the form of two cam-operated contacts, one of which T1 closes for a short interval during each cycle to ground lead Z3, and the other T2 closes for a short interval, 2 minutes, say, after T1, and grounds lead Z2. The cams may be mounted on the same shaft, driven by a motor, not shown, which may be started by applying ground to the lead ST.

If the first choice line finder #15 is busy, the ground connected to the "start-in" lead is extended over make contacts F1 to the "start-in" lead of the next choice line finder over the "start-out" lead. Ground on the "start-in" lead of the first idle finder encountered closes a circuit for relay A. Relay A operates, at contacts A1 opens a point in the circuit to the upper winding of relay F to prevent premature operation of the latter and closes a point in the circuit to the right-hand winding of relay D, and at contacts A2 prepares a locking circuit for the right-hand windings of relays B and D and places ground on the outgoing test lead P. Relay A at contacts A3 also closes a circuit for the upper winding of relay C via vertical springs VS1, rotary magnet springs WR1 and contacts F2.

Relay C operates and at contacts C1 closes a circuit A3, C1, E3, F3, for the vertical stepping magnet V. The vertical magnet V operates, actuating the vertical springs VS and raising the shaft of the wipers of the switch one level. The circuit of relay C is now opened at springs VS1 and as the shaft leaves its normal position the off-normal springs NS are operated, springs NS1 preparing a circuit for the release magnet Z and springs NS2 preparing locking circuits for relays B and D.

If the switch illustrated is the first choice to the subgroup to which the calling line belongs, the first level marking contact of the vertical bank VB will be grounded and a circuit closed for the upper winding of relay C in series with the left-hand winding of relay E via springs VS1 and WR1.

If the above-mentioned circuit for the upper winding of relay C is not closed, relay C restores when its circuit is opened at the vertical springs VS1. The circuit of the vertical magnet V is now reclosed at contacts C1. The foregoing cycle of operations continues until the calling line level is found or the switch is raised to its tens or "0" level. The back-to-back rectifiers SQA prevent excessive sparking at the contacts C1 and E3 which interrupt the circuit of magnet V.

When the grounded contact #3 in the vertical bank VB is reached, the left-hand winding of relay E is energized in series with the upper winding of relay C over the operated vertical springs VS1. Relay E is made slow-to-operate to provide a short interval between the vertical and rotary motions to allow the wipers to cease vibrating. Relay E at contacts E1 opens a point in the circuit of the release magnet Z to prevent premature release of the switch, at E2 closes a circuit to the right-hand winding of relay E in series with the vertical magnet V, at contacts E3 transfers the impulsing circuit from the vertical magnet V to the rotary magnet R and at contacts E4 prepares a locking circuit for the right-hand winding of relay B. Magnet V restores when its impulsing circuit is opened due to the high resistance of the right-hand winding of relay E and allows the vertical springs VS1 to restore.

The rotary magnet R operates and rotates the wipers in the bank, thus disengaging the wiper associated with the vertical bank VB and operating the rotary springs WR. The circuit to the upper winding of relay C is now opened at springs WR1 and locking circuits to the right-hand windings of relays D and B are prepared at springs WR2.

If the calling line is associated with the first set of bank contacts, a circuit to the left-hand winding of relay D or B is closed in series with the lower winding of relay C from battery via the winding of the cut-off relay CO of the line circuit, contacts L1 and the test wiper T1 or T2.

If the calling line is not associated with the first set of bank contacts of the level, relay C restores when the circuit of its upper winding is opened at rotary springs WR1, and opens the circuit to the rotary magnet R which deenergizes and restores the springs WR. The circuit of relay C is now reclosed at springs WR1 and a point in the locking circuits of relays B and D is opened at springs WR2. Relay C now reoperates and at contacts C1 recloses the circuit to the rotary magnet R. The foregoing cycle of operation and release of the rotary magnet R and of the relay C continues until the calling line is found or the line finder rotates to its 11th position. The back-to-back rectifiers SQB prevent excessive sparking at contacts C1.

When the calling line is found, the circuit to the lower winding of relay C is closed in series with the left-hand winding of relay D or relay B over the wiper T1 or T2 and thus relay C remains operated over its lower winding when the circuit to its upper winding is opened at the rotary springs WR1. Cut-off relay CO in the calling line circuit operates, and at contacts CO2, CO3 disconnects the line relay L which restores and removes the marking ground from the vertical bank VB and from the lead G.

If the calling line is associated with the first bank of 100 lines, relay D operates over its left-hand winding and locks up over its right-hand winding and contacts D1, WR2 and A2. At contacts D2 a point in the circuit of the left-hand winding of relay B is opened and the left-hand winding of relay D is short circuited thus reducing the resistance to ground on the test wiper T1 to mark the calling line busy. At contacts D3 a point in the circuit to the release magnet Z is opened and a circuit is closed for the upper winding of relay F via the off-normal springs NS2. The talking wires of the line finder are switched through at contacts D4 and D5.

If the calling line is associated with the second bank of 100 lines, relay B operates over its left-hand winding instead of relay D, and closes a locking circuit for itself over its right-hand winding at contacts B1. At contacts B2 and B3, the talking wires are switched over from the wipers W+1 and W−1 to the wipers W+2 and W−2 and at contacts B4 a circuit is closed for the right-hand winding of relay D via contacts A1 and NS2. At contacts B5 the circuit to the wiper T2 is transferred to the lower winding of relay C to make the calling line busy. Relay D operates and locks over its right-hand winding and contacts D1, WR2 and A2, and at contacts D3 opens a point in the circuit of release magnet Z and closes a circuit for the upper winding of relay F. The talking conductors are switched through at contacts D4 and D5.

Upon the operation of relay F the "start-in" lead of the chain circuit is extended to the "start-out" lead at contacts F1, at point in the circuit of the upper winding of relay C is opened at contacts F2, and at contacts F3 the circuit to the right-hand winding of relay E and the vertical magnet V in series is opened. At contacts F4 a multiple ground is removed from the parallel lead S and at contacts F5 the circuit of relay A is opened and the lower winding of relay F is connected to the "start-in" lead. At contacts F6 a point in the circuit to the left-hand winding of relay D is opened and the indirect ground on the wiper T1 and T2 is replaced by direct ground on the forward test lead P. The rotary springs WR2 are short circuited at contacts F7 to maintain the locking circuit to relay D, after the rotary magnet R restores, if the calling line is associated with the first bank or the locking circuits to both relays D and B if the calling line is associated with the second bank.

Relay C now releases, at contacts C1 opens the circuit of the rotary magnet R which restores the rotary springs WR. The original locking circuit to relay D or to both relays D and B is opened at springs WR2. Relay E releases, at contacts E1 closes a point in the circuit of the release magnet Z and at contacts A2 removes a multiple ground from the forward test wire P. Relay A, which is made slow to release, restores, at contacts A1 opens a multiple locking circuit to the right-hand circuit of relay D if the calling line is associated with the second bank, and closes a multiple circuit to the upper winding of relay F to prevent its release until the switch has returned to normal, at contacts A2 removes a multiple ground from the forward test wire P, and at contacts A3 removes the short circuit from the lower winding of relay C.

When the calling subscriber disconnects, a succeeding switch removes ground from the test wiper P, thereby opening the circuit to the right-hand winding of relay D, which restores and at contacts D3 closes the circuit to the release magnet Z. The release magnet Z operates and allows the shaft and wipers to return to normal and restore the off-normal springs NS. When the wiper shaft reaches its normal position the circuit of the release magnet Z is opened at springs NS1, and at springs NS2 the circuit to the upper winding of relay F and the right-hand winding of relay B is opened if this latter relay is operated.

If the "start-in" lead is not grounded at this time consequent upon another line being in a calling condition, relay F restores when the circuit to its upper winding is opened at springs NS2. At contacts F1 and F5 this line finder is prepared for operation on the next call by transferring the "start-in" lead from the "start-out" lead to the winding of relay A so that this switch will function the next sime the "start-in" lead is grounded. At contacts F4 ground is connected to the relay CH over the parallel lead S. If the "start-in" lead is grounded at the time the line finder releases, relay F remains operated through its lower winding to prevent transferring a call in progress on a succeeding choice line finder. When ground is removed from the "start-in" lead, relay F restores as previously described.

If for any reason the line finder fails to find a grounded contact in the vertical bank VB, the switch wipers are raised to the 10th (0) level as previously described. The last contact in the vertical bank is connected directly to ground and the switch then continues its operation as previously described.

If for any reason the test wiper T1 or T2 fails to encounter battery through a cut-off relay CO on the level over which it is searching, the switch will rotate to its 11th rotary position, as previously explained, in which the springs CS are operated. The circuit to the right-hand winding of relay D is closed at springs CS1 and at springs CS2 the rotary springs WR1 are short circuited to prevent further interruption of the circuit to the rotary magnet R. Relay D operates, as contact D3 closes a circuit for the upper winding of relay F and causes the switch to function as previously described except that the circuit to the associated group selector is not closed and consequently relay A, upon restoring, removes ground from the forward test lead P at contacts A1 to allow the switch to release, as already described.

Referring now to Fig. 2, when the line finder seized the calling line, the line relay L of the line circuit released and disconnected ground from subgroup lead G3 and from the #3 vertical bank contacts. Provided no other call is originated in subgroup #3 and no other line relay is operated, relay CB will release, open its contacts CB4 in the circuit of stepping magnet DM, and the distributor switch DS will step into its next position (5). Thus, the next call in the odd sub-groups will select as first choice line finder #26 over a lead G1, G3, etc., CH6, TM1, B4 and B3; and for the next call in the even sub-groups will select as first choice line finder #16 over a lead G2, G4, etc., CH1, TM2, B5 and B2.

The release of relay CB also at contacts CB5 removes ground from the start lead ST to the timer at contacts CB2 opens the locking circuit of relay CD.

If all the line finders served by this circuit become busy, there is no circuit for relay CH over the lead S since this lead is connected in parallel to normally grounded break contacts (F4) of relays (F) which operate when a line finder is in use.

Relay CH releases and thereupon grounds a lead to operate an all-line-finder busy meter ATB over contacts CH2 and left-hand contacts of toggle switch RT, at contacts CH4 lights a supervisory lamp GD, and at contacts CH3 closes a circuit for the primary winding of the busy tone coil BTC to cause busy tone to be applied over conductor BT to all the subscribers' line circuits served by the finder group, to indicate to any other such subscriber who calls that the call cannot be handled at this time. The operating circuit of relay CD is also opened at contacts CH5.

If a call (or calls) is originated during an all-line-finder busy condition, relay CB is operated as previously described and an overflow meter OF is actuated over contacts CB3, CH2 and left-hand contacts of the toggle switch RT.

As soon as a finder becomes idle, the parallel circuit S is closed again, relay CH operates and at contacts CH2 opens the circuits to the all trunks busy and overflow meters ATB and OF, at contacts CH4 extinguishes the lamp GD, and at contacts CH5 prepares the circuit of relay CD from the timer lead Z3. Relay CD is made slow-to-release so as to prevent pulsing the overflow meter OF if a subscriber spins his impulse dial during an all-line-finder busy condition, and thereby intermittently grounds a start lead G.

If for any reason a calling line is not served by a finder within a predetermined interval (e. g. 24 seconds), and an all-finders-busy condition does not exist, since relay CH is energized and relay CB is not operated, when the timer places a ground on the lead Z3, a circuit is closed to relay CD over CH5, CB2, C15, RT. Relay CD locks up over contacts CD4, opens its operating circuit, and at contacts CD3 prepares a circuit for relay CI from the timer lead Z2.

Within a predetermined interval (e. g. 2 minutes) after relay CD operates from ground on the Z3 lead, the timer places a momentary ground on the lead Z2 thus closing the circuit to relay CI. Relay CI operates and at CI1 and CI2 removes battery from the line finder hold conductor H thus causing all finders which are locked out to release and serve other calls which are waiting. Relay CI locks over its lower winding and contacts CI3 and CB6 as long as the subscriber holds and relay CB is operated. Condenser QD in series with resistor YA prevent sparking at contacts CI1 and CI2.

Relay CI upon operating, at contacts CI1 also closes a circuit for a supervisory lamp SA and an audible alarm FAU. When all waiting calls have been served, relay CB falls back and opens the circuits of relays CI and CD. CD is made slower to release than CI to prevent CI from holding over contacts CD2.

Relay CB also at contacts CB3 opens a point in the circuit to the overflow meter OF, and at CB5 removes ground from the timer start lead ST to permit the timer to cease operating. Relay CI upon restoring disconnects lamp SA and alarm FAU and replaces battery on the hold conductor H.

Should the relay CH burn out or fail to operate for any reason the circuit of the guard lamp GL is continuously closed at contacts CH4 and the lamp lights steadily.

Should a "start-in" lead become grounded, the first available finder nearest the foreign ground will attempt to find a calling line and, failing to do so, will move to its eleventh rotary position in which relay F is energized, opens a point in the chain circuit and extends the "start-out" lead to the next idle finder. The finder thus locks itself out of service until the foreign ground is removed. All other available line finders will then operate in turn in like manner and when the last available finder has functioned, the circuit of relay CH is opened. Relay CH restores and closes a circuit to relay CI over its lower winding, contacts CH1 and wiper B5 of the switch DS to the false ground on the start lead. Relay CI locks over CI3, CD2, RT, at CI1 and CI2 removes battery from the hold lead H of the line finders to allow all locked out finders to restore, thus reclosing the circuit of relay CH and causes it to reoperate. Relay CI also at CI1 closes the circuit of the urgent alarm FAU.

After relay CI operates, the finder nearest the foreign ground will continually attempt to find the calling line until the false ground is removed from the start lead. Since this finder is stepped to the eleventh rotary position of the tenth level, subscriber calls may still be made as the placing of such calls will mark levels below the eleventh.

If the distributor switch DS fails to step due to a fault, the circuit will still operate and calls will progress through the chain, but the samefinders are repeatedly taken into use. Provision must be made in these circumstances, to give a non-urgent alarm. A check is therefore made to ascertain that the switch DS has stepped when ground is removed from its stepping magnet DM at contact CB4. This is done via the bank B6 of the distributor switch DS and the differential relay CE, the respective opposing windings of which are connected to the even and odd contacts of bank B6 so that the relay is restored as the switch DS steps. For example, assuming that the switch is standing in its normal position N and that a call is initiated. Relay CB operates and applies ground to magnet DM via contacts CB4, and at the same time a circuit is closed for the left-hand winding of relay CE via rectifier MRB and wiper B6. When relay CB restores the magnet DM should step. Provided that it does so, in the next position relay CE is energized over its opposing right-hand winding and restores, opening at CE1 the circuit of the alarm lamp RA. However, if the distributor switch failed to step when relay CB released, the relay CE remains operated over contact N and its left-hand winding. The alarm lamp RA thus remains lighted. It should be noted that the alarm condition is momentarily interrupted when a subscriber originates a call and relay CB operates.

Since the distributor switch DS has an odd number of positions, the eleventh position in bank B6 is not connected to the relay CE and the following means is used to check that it steps from position 9 to 10. Relay CE is energized via its right-hand winding in position 9. When relay CB restores, provided that the switch steps to position 10, current flows through the resistor YC and the charging current through condenser QB passes through the left-hand winding of relay CE, which restores and opens the circuit alarm lamp RA. In position 10, relay CE is re-operated over rectifier MRB and its right-hand winding when relay CB again operates. When relay CB now releases and the switch steps to position N, the left-hand winding of relay CE is energized and relay CE is released.

The toggle switch RT permits the test man to check the vertical and rotary operation of all idle line finders. When the RT toggle switch is operated, ground is transferred from the circuits of the meters OF and ATB to the lead G1 and "Vert. Bank 1" lead VI. Ground will then be connected to the "start-in" lead of a line finder associated with the terminal on which the distributor switch is standing, via CH6 and bank B4. The line finder will attempt to find a calling line, and, failing to do so, will open part of the chain circuit, extend the "start-in" lead to the next line finder in the chain and lock itself out of service as previously described. All other available line finders will then operate in like manner and when the last available line finder has functioned, the circuit to relay CH is opened. CH restores and the above cycling of the line finders is repeated until the toggle switch RT is released.

The toggle switch RT also opens the circuit to relay CD to prevent a false alarm from the timer.

The toggle switch BT when operated disconnects the busy tone transformer BTC from the busy tone lead and closes the circuit to the lamp GD, which lights.

The toggle switches TM1 and TM2 are operated when the distributor switch DS is being adjusted during service. Switches TM1 and TM2, when operated, by-pass the distributor switch banks for connection to the "start-in" leads. The lamp GD lights when switch TM1 and/or TM2 is operated.

The toggle switches RT, BT, TM1 and TM2 may be of any known kind.

While we have described above the principles of our invention in connection with specific apparatus, it is to be clearly understood that this description is made only by way of example and not as a limitation to the scope of our invention.

What is claimed is:

1. In a telephone system a plurality of lines, a plurality of switches having access to said lines, a chain circuit, means for selecting for use an idle one of said switches over said chain circuit, a distributor switch comprising a wiper and a plurality of associated bank contacts, connections from said contacts to different points of entry into said chain circuit, a start conductor, means for connecting said start conductor to said wiper, means responsive to one of said lines being placed in a calling condition for applying a potential to said start conductor whereby an idle one of said switches is seized and means for thereafter advancing said wiper to a different bank contact.

2. A telephone switching arrangement according to claim 1, further comprising checking means for automatically checking that said distributor switch has advanced after an idle line finder is taken into use, an alarm device, and means responsive to said checking device for actuating said alarm device if the distributor switch has not advanced.

3. A telephone switching arrangement according to claim 2 in which said checking device comprises an additional wiper provided on said distributor switch and an associated additional contact bank, a relay having two opposing windings, connections from said respective windings to alternate contacts of said additional bank and a circuit for said alarm device including contacts of said relay.

4. A telephone switching arrangement according to claim 3 in which said distributor switch has an odd number of positions and in which the last contact of said additional contact bank is connected to a source of current over a resistance and to that winding of said relay which is not connected to the contact in the preceding position of the switch.

5. In a telephone system a plurality of lines, a plurality of switches having access to said lines, a closed chain circuit, means for selecting for use an idle one of said switches over said chain circuit, a start conductor, distributor switch means for extending said start conductor to different points of entry into said chain circuit, means responsive to one of said lines being placed in a calling condition for applying a potential to said start conductor whereby an idle one of said switches is seized, means for causing said seized switch to hunt for the line which is in a calling condition, and means responsive to the engagement of said line by said switch for causing said distributor switch means to extend said start conductor to a different point of entry into said chain circuit.

6. In a telephone switching system, a group of substation lines, a plurality of line finders having access to said lines, a chain circuit, means for selecting for use an idle one of said line finders over said chain circuit, a distributor switch having wiper means and bank contacts, connections from said bank contacts to different points of entry into said chain circuit, a start conductor, means for connecting said start conductor to said wiper means, means responsive to the initiation of a call on a sub-station line for applying a potential to said start conductor whereby an idle line finder is seized and means for thereafter moving said wiper to a different bank contact.

7. In a telephone switching system, a first group of substation lines, a second group of substation lines, a plurality of line finders having access to both the first and second group of substation lines, a chain circuit, means for selecting for use idle ones of said line finders over said chain circuit, a distributor switch having first and second wipers, respectively associated with first and second sets of bank contacts, means for connecting the bank contacts of said first and second sets of contacts to different points of entry into said chain circuit, a first start conductor for said first group of substation lines, a second start conductor for said second group of substation lines, means for connecting said first start conductor to said first wiper, means for connecting said second start conductor to said second wiper, means responsive to the initiation of a call on a substation line in said first group for applying a potential to said first start conductor whereby an idle line finder is seized and caused to hunt for said substation line in said first group, and means responsive to the initiation of a call on a substation line in said second group for applying a potential to said second start conductor whereby another idle line finder is seized and caused to hunt for said substation line in said second group.

8. A telephone switching arrangement according to claim 7 further comprising means responsive to the seizure of a calling line for causing said distributor switch to advance to a different position.

9. A telephone switching arrangement according to claim 7 wherein said distributor switch is provided with a plurality of other wipers and respective sets of bank contacts which are each connected to different points of entry into said chain circuit, the bank contacts associated with said first wiper being connected in a certain order to said plurality of other wipers and the bank contacts associated with said second wiper being connected in a different order to said plurality of other wipers.

10. A telephone switching arrangement according to claim 7, further comprising an alarm device, timing means and means responsive to said timing means for actuating said alarm device if a line in a calling condition is not served by a line finder within a predetermined time interval.

11. A telephone switching arrangement according to claim 7 wherein said means for connecting said first and second start conductors to said first and second wipers comprise a pair of contact sets of a relay the winding of which is connected in parallel circuits extending to each said line finder and adapted to be opened when the respective line finder is in use.

12. A telephone switching arrangement according to claim 11, further comprising a guard lamp and a circuit therefor including contacts of said relay.

13. A telephone switching arrangement according to claim 12, further comprising an alarm relay, a circuit for said alarm relay including contacts of said first-mentioned relay and one of said first or second wipers, an urgent alarm device and a circuit for said device including front contacts of said alarm relay.

No references cited.